3,322,688
LOW TEMPERATURE ISOMERIZATION
CATALYST AND PROCESS
William C. Starnes, Cabot, Pa., assignor to Gulf Research & Development Company, Pittsburgh, Pa., a corporation of Pennsylvania
No Drawing. Filed Apr. 9, 1964, Ser. No. 358,628
7 Claims. (Cl. 252—439)

This invention relates to preparation of a novel low temperature isomerization catalyst composition useful in the isomerization of relatively unbranched hydrocarbons to more highly branched forms.

In accordance with the present invention, a composite catalytic material comprising a major proportion of alumina and containing a minor proportion of a metalliferous material having hydrogenating activity, such as platinum metal, is activated for isomerization of hydrocarbons by contact thereof with sulfur monochloride at nonreducing conditions at an elevated temperature effective to promote a substantial increase in the chlorine content of said composite material. The thus-activated material has been found to be highly effective as a low temperature isomerization catalyst for paraffinic hydrocarbons. In a preferred embodiment, the activation is carried out at a temperature in the range of about 700° to 950° F. The present invention, therefore, includes the method of activating the catalyst base, the activated catalyst, as such, and a process of isomerizing hydrocarbons therewith.

The composite catalysts from which the activated catalysts of this invention are derived can comprise any form of porous alumina suitable for use as a catalytic agent or support. For example, excellent results are obtainable with aluminas prepared by calcining a beta-alumina trihydrate such as bayerite or mixtures thereof with other alumina hydrates, but aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha- and beta-alumina monohydrate such as boehmite and diaspore, or various combinations of any of these can be used. Also, there can be used the aluminas described in copending patent applications Serial Nos. 118,240, now Patent No. 3,188,174, 118,241, now Patent No. 3,151,939, and 118,279, filed June 20, 1961, now Patent No. 3,151,940, in the names of William L. Kehl and Meredith M. Stewart, which aluminas are prepared by calcining an alumina hydrate containing 1.2 to 2.6 mols of water of hydration. The alumina bases useful in the present invention can be essentially pure alumina as is preferred, or they can contain small amounts, up to about 45 percent of other refractory oxides, such as silica, beryllia, titania, zirconia or boria. Such aluminas are generally characterized by a high surface area, commonly ranging from about 200 to 500 m.$^2$/g., or even more. Especially advantageous results are obtainable when using aluminas having a surface area above about 250 m.$^2$/g., and more particularly, above 300 m.$^2$/g., although aluminas of lower surface area can be used. Presumably, the amount of chlorine that can be taken up during the sulfur monochloride treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metalliferous component, having hydrogenating activity and selected from the left-hand column of Group VI or from Group VIII of Mendelyeev's Periodic Table. Examples of suitable materials are platinum, rhodium, palladium, nickel and tungsten. Especially good results are obtainable with platinum and palladium. In general, the hydrogenating component will be present in amounts in the range of about 0.01 to 5.0 percent by weight of the catalyst, and preferably about 0.1 to 2.5 percent, particularly in the case of noble metal components. By way of example, excellent results are obtainable with 0.5 and 0.7 percent platinum or 2 percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added to the alumina hydrate prior to precipitation with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to treatment with the sulfur monochloride to minimize loss of the hydrogenating component by formation of volatile complexes during sulfur monochloride treatment. In the case of base metals such as nickel and tungsten, the hydrogenating component can remain in the form of a sulfide or oxide prior to the sulfur monochloride treatment.

It is also important that the hydrogenating component be composited with the alumina base before the sulfur monochloride treatment, as deposition after the sulfur monochloride treatment normally will result in a reduction of the chlorine content of the sulfur monochloride-treated base. This is undesirable, as the activity of the herein-disclosed catalyst appears to be related to the increase in chlorine content derived from the sulfur monochloride.

The catalyst base can contain halogen other than that incorporated by the sulfur chloride treatment. For example, some halogen content may result from the use of an aluminum halide as a starting material to form the alumina base or alternatively, some halogen may remain in the catalyst owing to the use of a halogen-noble metal acid. However, the halogen content from such sources as those does not appear to be equivalent, for purposes of this invention, to the halogen content resulting from the sulfur monochloride treatment.

As indicated previously, the sulfur monochloride treatment of the catalyst base is carried out under nonreducing conditions effective to promote a substantial increase in the chlorine content of the catalyst base. The use of nonreducing conditions is important as reducing conditions may lead to formation of hydrogen chloride, which in turn will reduce the effective amount of chlorine available to combine with the catalyst base. As pointed out above, the chlorine content of the treated catalyst that is attributable to sulfur monochloride treatment appears to be related to the activity of the catalyst for purposes of this invention. The nonreducing conditions can be achieved merely by exclusion from the reaction zone of materials other than the catalyst base and the sulfur monochloride. Alternatively, the sulfur monochloride can be contacted with the catalyst base, together with an inert carrier gas such as nitrogen, or with an oxidizing gas such as air or oxygen. By "nonreducing conditions" is meant essentially nonreducing conditions. Accordingly, conditions under which a small proportion of a reducing component such as hydrogen are present are not intended to be excluded.

The sulfur monochloride may be contacted with the catalyst base in any proportions and under any conditions sufficient to substantially increase the chlorine content of the catalyst base. Proportions sufficient to increase the chlorine content of the catalyst base by about one percent under the reaction conditions employed will produce an appreciable improvement in the activity of the catalyst, but I prefer to utilize larger proportions sufficient to increase the chlorine content of the catalyst by at least about 3 and preferably up to about 20 percent by weight. However, still larger proportions can be used; for example, there can be used amounts sufficient to yield up to 30 percent chlorine in the catalyst base without undue difficulties. Within the limits indicated, the use of a sulfur monochloride in weight ratios of about 0.02 to 20.0, and preferably about 0.3 to 3 with respect to the catalyst base, are effective at the conditions disclosed herein to achieve the desired results.

The sulfur monochloride interacts with the catalyst base most readily at elevated temperatures. Especially active catalysts are obtained when using treating temperatures in the range of about 700° to 900° F., but higher or lower temperatures can be used. For example, temperatures as low as 300° F. are effective to promote the desired interaction. The treating temperature should not exceed about 1000° F. to avoid physical damage to the catalyst base. Within the temperature ranges disclosed, contact times of about 15 minutes to 5 hours, preferably about 0.5 to 3 hours, are effective to increase the chlorine content of the catalyst base to a satisfactory level for purposes of this invention.

The finished catalysts prepared as indicated are not completely free of sulfur, but chlorine is present in a disproportionate amount with respect to sulfur. Thus, whereas a typical sulfur content of a catalyst prepared in accordance with this invention might be about 0.3 percent by weight, the corresponding chlorine content of such catalyst might be as much as about 6 to 12 percent. While it is presumed that the chlorine interacts chemically in some not fully understood way with the catalyst base, available evidence indicates that the nature of the reaction is unique, as catalysts prepared in the manner disclosed herein have been found markedly superior to comparable catalysts in which the chlorine content of the catalyst is increased, for example, by treatment with vaporous aluminum chloride.

The activated catalyst is advantageously subjected to a reducing treatment with hydrogen, at conditions that are effective preferentially to reduce the sulfur content, before the activated catalyst is used for isomerization.

The catalyst activated as described above can be used, as such, for low temperature isomerization of paraffinic hydrocarbons, or they may be further treated by heat at a temperature greater than that used in the activation treatment, up to a temperature of 1000° F., for about 0.5 to 3 hours, to remove unreacted chlorine and to effect further reaction thereof with the base.

EXAMPLE I

A commercial platinum-on-alumina reforming catalyst having a platinum content of 0.71 percent and a chlorine content of 0.79 percent was charged to a glass reactor in the amount of 61.1 grams (125 ml.). The temperature of the catalyst was raised to 500° F. in a furnace and a slow flow of nitrogen was established over the catalyst. Sulfur monochloride in the amount of 15.2 grams (19.1 ml.) was dripped into the top of the glass reactor over a period of 1¾ hours. After cooling, with continued nitrogen purging, a sample of the catalyst was analyzed and found to contain 4.83 percent chlorine and 0.63 percent sulfur.

Catalysts that have been activated by the process described herein are useful in the low temperature isomerization of isomerizable saturated hydrocarbons, including not only straight-chain and slightly branched paraffins such as n-butane, n-pentane and n-hexane, but also cycloparaffins such as cyclopentane and cyclohexane and their corresponding methyl- and dimethyl-substituted derivatives. These compounds need not be pure but can be mixed with other hydrocarbon materials as in the case of fractions obtained by fractional distillation of gasoline and naphtha cuts obtained from crude oils or reforming, for example. The process is especially advantageous for vapor phase isomerization of straight-chain paraffin hydrocarbons containing 4 to 6 carbon atoms. When the isomerization feed stock is derived from crude oil, the sulfur content may be so high as detrimentally to affect the catalyst. In such instances, it may be desirable to desulfurize the feed prior to isomerization in conventional maner, preferably by treatment with a suitable desulfurizing catalyst in the presence of hydrogen at elevated temperature and pressure. Desulfurization is especially important when the hydrogenating metal component of the herein-disclosed catalysts is sensitive to sulfur, as in the case of platinum.

Isomerization of the herein-disclosed feed stock is carried out at low temperatures in the range of about 150° to 450° F. in the presence of hydrogen gas at a pressure of about 100 to 1000 p.s.i.g., preferably about 400 to 650 p.s.i.g., using a hydrogen:hydrocarbon mol ratio in the range of about 0.1 to 5:1, preferably about 0.3 to 3.5:1. Space velocities of about 0.3 to 10 and preferably 0.5 to 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product.

The invention is not limited by the foregoing specific embodiments and good results will also be obtained with other catalysts prepared at other conditions described herein and with other feed stocks and at other isomerization conditions within the range disclosed herein.

With continued use in isomerization the catalyst described herein will decline in activity and selectivity. When the activity and/or selectivity have reached an unsatisfactory level, isomerization can be terminated and the deactivated catalyst can be replaced or regenerated. Regeneration can be carried out by heating at a temperature of 900° F. in the presence of an inert gas such as nitrogen or an oxygen-containing gas, or a mixture of both, followed by reactivation in the manner described herein.

I claim:

1. The method of activating a composite catalyst comprising a major proportion of alumina and containing a minor proportion of a metalliferous material having hydrogenating activity, comprising providing a system containing said composite catalyst, sulfur monochloride, introducing into said system said introduction of sulfur monochloride being carried out while maintaining said system at nonreducing conditions at an elevated temperature in the range of about 300° to 1000° F. that is effective to promote a substantial increase in the chlorine content of the composite catalyst.

2. The method of claim 1 wherein the metalliferous material is platinum in reduced form.

3. The method of claim 1 wherein the alumina has a surface area of more than 250 square meters per gram.

4. The method of activating a composite catalyst comprising a major proportion of alumina and containing a minor proportion of a metalliferous material having hydrogenating activity, comprising providing a system containing said composite catalyst, introducing sulfur monochloride into said system, said introduction of sulfur monochloride being carried out while maintaining said system at nonreducing conditions at an elevated temperature in the range of about 700° to 900° F. that is effective to promote a substantial increase in the chlorine content of the composite catalyst.

5. The method of activating a composite catalyst comprising a major proportion of alumina and containing a minor proportion of a metalliferous material having hydrogenating activity, comprising providing a system containing said composite catalyst, introducing sulfur monochloride into said system using a sulfur monochloride:catalyst weight ratio of about 0.02 to 20:1, said introduction of sulfur monochloride being carried out while maintaining said system at nonreducing conditions, and at an elevated temperature in the range of about 300° to 1000° F. that is effective to promote a substantial increase in the chlorine content of the composite catalyst, for a period of about 15 minutes to 5 hours.

6. The method of activating a composite catalyst comprising a major proportion of alumina and containing a minor proportion of a metalliferous material having hydrogenating activity, comprising providing a system containing said composite catalyst, introducing sulfur monochloride into said system using a sulfur monochloride:catalyst weight ratio of about 0.03 to 3:1, said introduction of sulfur monochloride being carried out while maintaining said system at nonreducing conditions, and at an elevated temperature in the range of about 700° to 900° F. that is effective to promote a substantial increase in the chlorine content of the composite catalyst, for a period of about 0.5 to 3 hours.

7. The method of activating a composite catalyst comprising about 0.1 to 2.5 percent platinum in reduced form, the balance being substantially all alumina having a surface area of more than 250 square meters per gram, comprising providing a system containing said composite catalyst, introducing sulfur monochloride into said system, using a sulfur monochloride:catalyst weight ratio of about 0.03 to 3:1, said introduction of sulfur monochloride being carried out while maintaining said system at nonreducing conditions, and at an elevated temperature in the range of about 700° to 900° F. that is effective to promote a substantial increase in the chlorine content of the composite catalyst, for a period of about 0.5 to 3 hours.

References Cited
UNITED STATES PATENTS

| | | | |
|---|---|---|---|
| 2,606,878 | 8/1952 | Haensel | 252—442 |
| 3,116,259 | 12/1963 | Geerts et al. | 252—439 |
| 3,218,267 | 11/1965 | Goble et al. | 260—683.68 |

OTHER REFERENCES

Moeller, Inorganic Chemistry, pages 519–20, John Wiley and Sons, New York, 1952.

DELBERT E. GANTZ, *Primary Examiner.*

R. H. SHUBERT, *Assistant Examiner.*

UNITED STATES PATENT OFFICE
CERTIFICATE OF CORRECTION

Patent No. 3,322,688

May 30, 1967

William C. Starnes

It is hereby certified that error appears in the above numbered patent requiring correction and that the said Letters Patent should read as corrected below.

Column 4, line 61, strike out "sulfur monochloride," and insert the same, after "system" in line 62 same column 1.

Signed and sealed this 2nd day of January 1968.

(SEAL)
Attest:

Edward M. Fletcher, Jr.
Attesting Officer

EDWARD J. BRENNER
Commissioner of Patents